United States Patent
Murahashi

(10) Patent No.: US 11,616,888 B2
(45) Date of Patent: Mar. 28, 2023

(54) IMAGE READING APPARATUS AND CONTROL METHOD TO PERFORM A DETERMINATION OF WHETHER A MEDIUM OVERLAPS ANOTHER MEDIUM BASED ON THE LIGHT QUANTITY BEING ABOVE OR BELOW A THRESHOLD AFTER CHANGING THE LIGHT QUANTITY FROM A FIRST LIGHT QUANTITY TO A SECOND LIGHT QUANTITY

(71) Applicant: SEIKO EPSON CORPORATION, Tokyo (JP)

(72) Inventor: Kenichi Murahashi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/650,872

(22) Filed: Feb. 14, 2022

(65) Prior Publication Data
US 2022/0263962 A1   Aug. 18, 2022

(30) Foreign Application Priority Data
Feb. 15, 2021   (JP) .............................. JP2021-021750

(51) Int. Cl.
*H04N 1/00* (2006.01)
*G01V 8/12* (2006.01)
*B65H 7/02* (2006.01)

(52) U.S. Cl.
CPC .......... *H04N 1/00705* (2013.01); *G01V 8/12* (2013.01); *H04N 1/00689* (2013.01); *H04N 1/00692* (2013.01); *H04N 1/00734* (2013.01); *H04N 1/00798* (2013.01)

(58) Field of Classification Search
CPC .. G01V 8/12; H04N 1/00692; H04N 1/00705; H04N 1/00734; H04N 1/00763; H04N 1/00769; H04N 1/00798; H04N 1/00628; H04N 1/00681; B65H 2511/524; B65H 7/06; B65H 7/12; B65H 7/125; G03G 2215/00548; G03G 2215/0035
USPC ......................................................... 358/488
See application file for complete search history.

(56) References Cited

U.S. PATENT DOCUMENTS 10,356,260 B1 * 7/2019 Takahashi .......... H04N 1/00779
2017/0126914 A1 * 5/2017 Koyanagi .......... H04N 1/00779

FOREIGN PATENT DOCUMENTS

JP   2004023427 A * 1/2004
JP   2017-085452 A    5/2017

* cited by examiner

*Primary Examiner* — Chad Dickerson
(74) *Attorney, Agent, or Firm* — Workman Nydegger

(57) ABSTRACT

When a medium detector detects that a state where a medium is absent is switched to a state where the medium is present with a light quantity of the medium detector set to a first light quantity, a controller in an image reading apparatus switches the light quantity from the first light quantity to a second light quantity, which is larger than the first light quantity. When a quantity of the light received by the medium detector exceeds a threshold, the controller determines whether the media overlaps each other, based on the detection result of the multi-feed detector. When the quantity of the light received does not exceed the threshold, the controller skips the determination of whether the media overlaps each other.

8 Claims, 9 Drawing Sheets

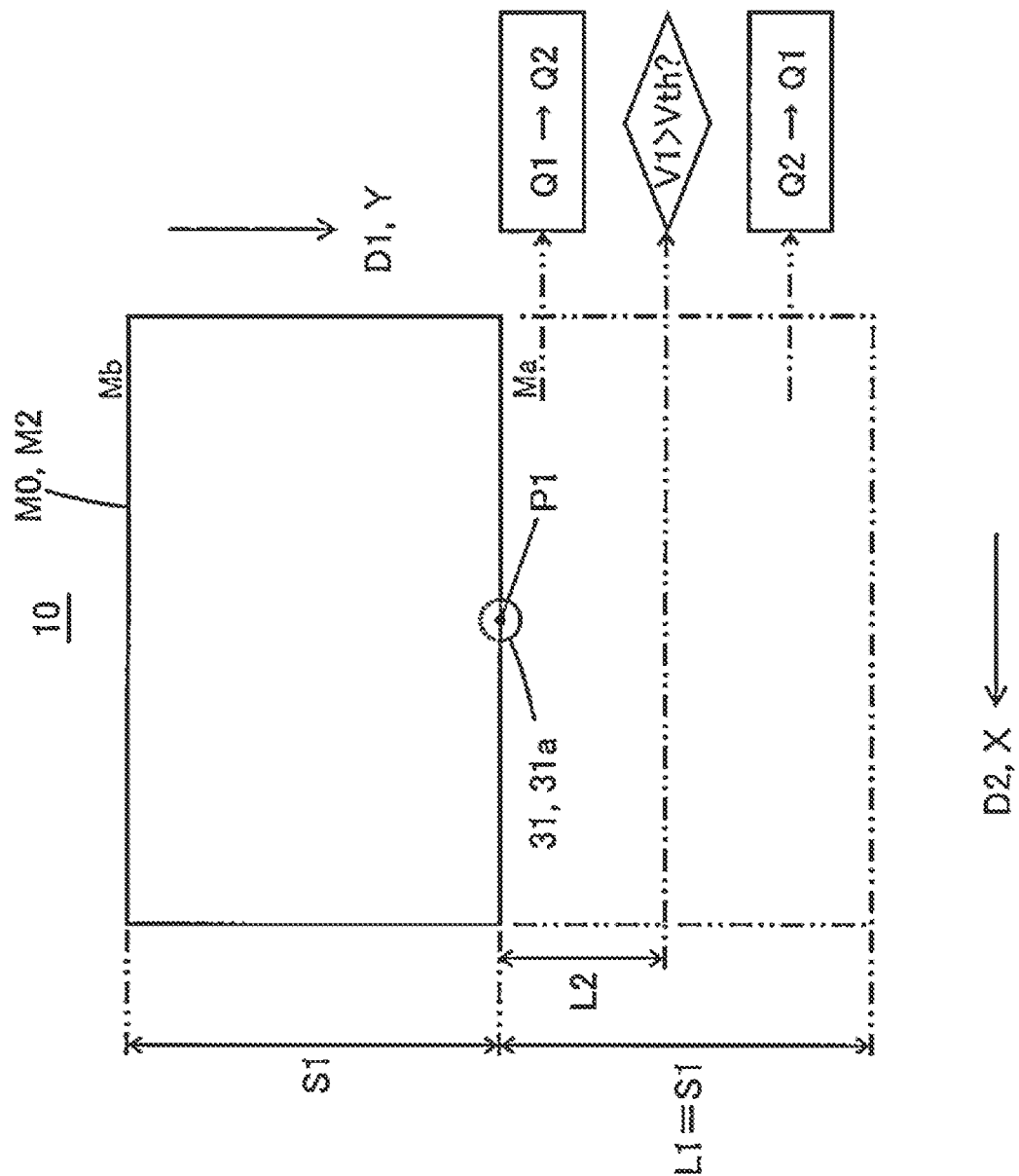

IMAGE READING APPARATUS AND CONTROL METHOD TO PERFORM A DETERMINATION OF WHETHER A MEDIUM OVERLAPS ANOTHER MEDIUM BASED ON THE LIGHT QUANTITY BEING ABOVE OR BELOW A THRESHOLD AFTER CHANGING THE LIGHT QUANTITY FROM A FIRST LIGHT QUANTITY TO A SECOND LIGHT QUANTITY

The present application is based on, and claims priority from JP Application Serial Number 2021-021750, filed Feb. 15, 2021, the disclosure of which is hereby incorporated by reference herein in its entirety.

BACKGROUND

1. Technical Field

The present disclosure relates to an image reading apparatus that reads an image on a medium being fed and to a method of controlling such an image reading apparatus.

2. Related Art

Some image reading apparatuses known in the art are equipped with automatic document feeders (ADFs). When a plurality of original sheets are placed on the sheet tray of an image reading apparatus, the ADF separately and sequentially feeds these original sheets to a reader, which then reads images thereon. However, if original sheets overlap each other inside the image reading apparatus, the reader may fail to read images thereon properly. Thus, an image reading apparatus needs to have a sensor that detects overlapping of original sheets. For example, JP-A-2017-85452 discloses an image reading apparatus provided with a start switch and an overlap-detection disable switch. This image reading apparatus is configured to selectively operate in two modes, an enabled mode and a disabled mode, depending on whether to detect overlapping of original sheets. When the image reading apparatus that operates in the enabled mode detects that original sheets overlap each other, it discontinues performing a reading operation, which is an operation of sequentially reading images on the original sheets while feeding them.

When feeding a single thick original sheet, such as a driver's license, health insurance card, membership card, or other plastic or cardboard card, an image reading apparatus that operates in the enabled mode may erroneously detect that a plurality of original sheets overlap each other and discontinue the reading operation. In this case, a user needs to operate the overlap-detection disable switch to set the image reading apparatus to the disabled mode and then to operate the start switch to resume the reading operation.

SUMMARY

According to an aspect of the present disclosure, an image reading apparatus includes: a feeder that feeds a medium in a feeding direction; a multi-feed detector that detects overlapping of the medium and another medium being fed along a transport route at a multi-feed detection location; a reader that reads an image on the medium being fed, the reader being disposed downstream of the multi-feed detection location in the feeding direction; a medium detector that detects presence or absence of the medium at a medium detection location positioned on the transport route between the feeder and the multi-feed detection location, the medium detector including a light transmitter that emits light with a light quantity to the medium detection location, the light quantity being variable, and a light receiver that receives the light that traveled across the transport route; and a controller that performs a process in accordance with detection results of the multi-feed detector and the medium detector. When the medium detector detects that a state where the medium is absent is switched to a state where the medium is present with the light quantity set to a first light quantity, the controller switches the light quantity from the first light quantity to a second light quantity, the second light quantity being larger than the first light quantity. When a quantity of the light received by the light receiver exceeds a threshold in response to switching of the light quantity from the first light quantity to the second light quantity, the controller determines whether the medium overlaps the another medium, based on the detection result of the multi-feed detector. When the quantity of the light received by the light receiver does not exceed the threshold in response to the switching of the light quantity from the first light quantity to the second light quantity, the controller skips determination of whether the medium overlaps the another medium.

According to another aspect of the present disclosure, there is provided a method of controlling an image reading apparatus. The image reading apparatus includes: a feeder that feeds a medium in a feeding direction; a multi-feed detector that detects overlapping of the medium and another medium being fed along a transport route at a multi-feed detection location; a reader that reads an image on the medium being fed, the reader being disposed downstream of the multi-feed detection location in the feeding direction; and a medium detector that detects presence or absence of the medium at a medium detection location positioned on the transport route between the feeder and the multi-feed detection location, the medium detector including a light transmitter that emits light with a light quantity to the medium detection location, the light quantity being variable; and a light receiver that receives the light that traveled across the transport route. The image reading apparatus is configured to perform a process based on detection results of the multi-feed detector and the medium detector. The method includes: a first step of, when the medium detector detects that a state where the medium is absent is switched to a state where the medium is present with the light quantity set to a first light quantity, switching the light quantity from the first light quantity to a second light quantity, the second light quantity being larger than the first light quantity; a second step of, when a quantity of the light received by the light receiver exceeds a threshold in response to switching of the light quantity from the first light quantity to the second light quantity, determining whether the medium overlaps the another medium, based on the detection result of the multi-feed detector; and a third step of, when the quantity of the light received by the light receiver does not exceed the threshold in response to the switching of the light quantity from the first light quantity to the second light quantity, skipping determination of whether the medium overlaps the another medium.

BRIEF DESCRIPTION OF THE DRAWINGS

FIG. 9 schematically illustrates the transport control process depending on the location of a medium being fed.

DESCRIPTION OF EXEMPLARY EMBODIMENTS

Figure 1:
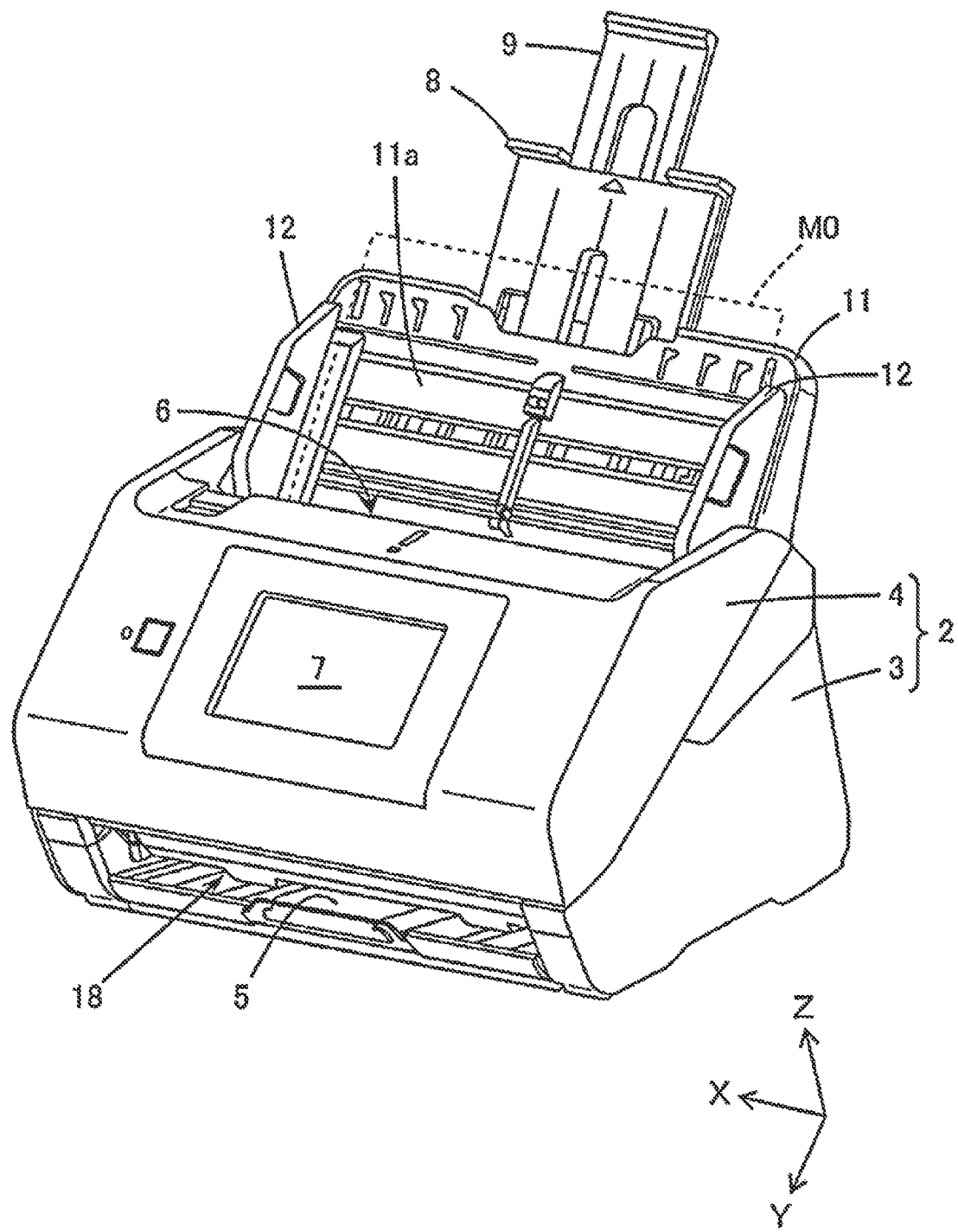
FIG. 1 is a schematic, perspective view of the exterior of an image reading apparatus according to an embodiment of the present disclosure.

Some embodiments of the present disclosure will be described below. It should be noted that those embodiments are examples of the present disclosure, and the features of the embodiments do not necessarily have to be essential.

(1) Technical Summaries of the Present Disclosure

Some technical summaries of the present disclosure will be described below with reference to FIGS. 1 to 9. FIGS. 1 to 9 schematically illustrate examples of the present disclosure, and their scales in the individual directions may be inconsistent with one another. The components of the present technology are not limited to concrete example components denoted by the references. In this summary, the words in the brackets refer to the supplementary explanations of their preceding words.

First Aspect

According to a first aspect of the present technology, as illustrated in FIGS. 1 to 4 and other drawings, an image reading apparatus (e.g., scanner LA) includes a feeder UF, a multi-feed detector 30, a reader 20, an optical medium detector 31, and a controller 40. The feeder UF feeds a medium M0 in a feeding direction D1. The multi-feed detector 30 detects overlapping of the medium M0 and another medium M0 being fed along a transport route 10 at a multi-feed detection location P2. The reader 20 reads an image on the medium M0 being fed, the reader 20 being disposed downstream of the multi-feed detection location P2 in the feeding direction D1. The optical medium detector 31 detects presence or absence of the medium M0 at a medium detection location P1 positioned on the transport route 10 between the feeder UF and the multi-feed detection location P2, the medium detector including a light transmitter 31a that emits light 31c with a light quantity Q0 to the medium detection location P1, the light quantity Q0 being variable, and a light receiver 31b that receives the light 31c that traveled across the transport route 10. The controller 40 performs a process in accordance with detection results of the multi-feed detector 30 and the optical medium detector 31. As illustrated in FIGS. 6 to 9, when the optical medium detector 31 detects that a state where the medium M0 is absent is switched to a state where the medium M0 is present with the light quantity Q0 set to a first light quantity Q1, the controller 40 switches the light quantity Q0 from the first light quantity Q1 to a second light quantity Q2, the second light quantity Q2 being larger than the first light quantity Q1. Furthermore, when a quantity (e.g., detected voltage V1 in FIGS. 8 and 9) of the light 31c received by the light receiver 31b exceeds a threshold (e.g., threshold Vth in FIG. 9) in response to switching of the light quantity Q0 from the first light quantity Q1 to the second light quantity Q2, the controller 40 determines whether the medium M0 overlaps the another medium M0, based on the detection result of the multi-feed detector 30. Moreover, when the quantity (V1) of the light 31c received by the light receiver 31b does not exceed the threshold (Vth) in response to the switching of the light quantity Q0 from the first light quantity Q1 to the second light quantity Q2, the controller 40 skips determination of whether the medium M0 overlaps the another medium M0.

Figure 6:
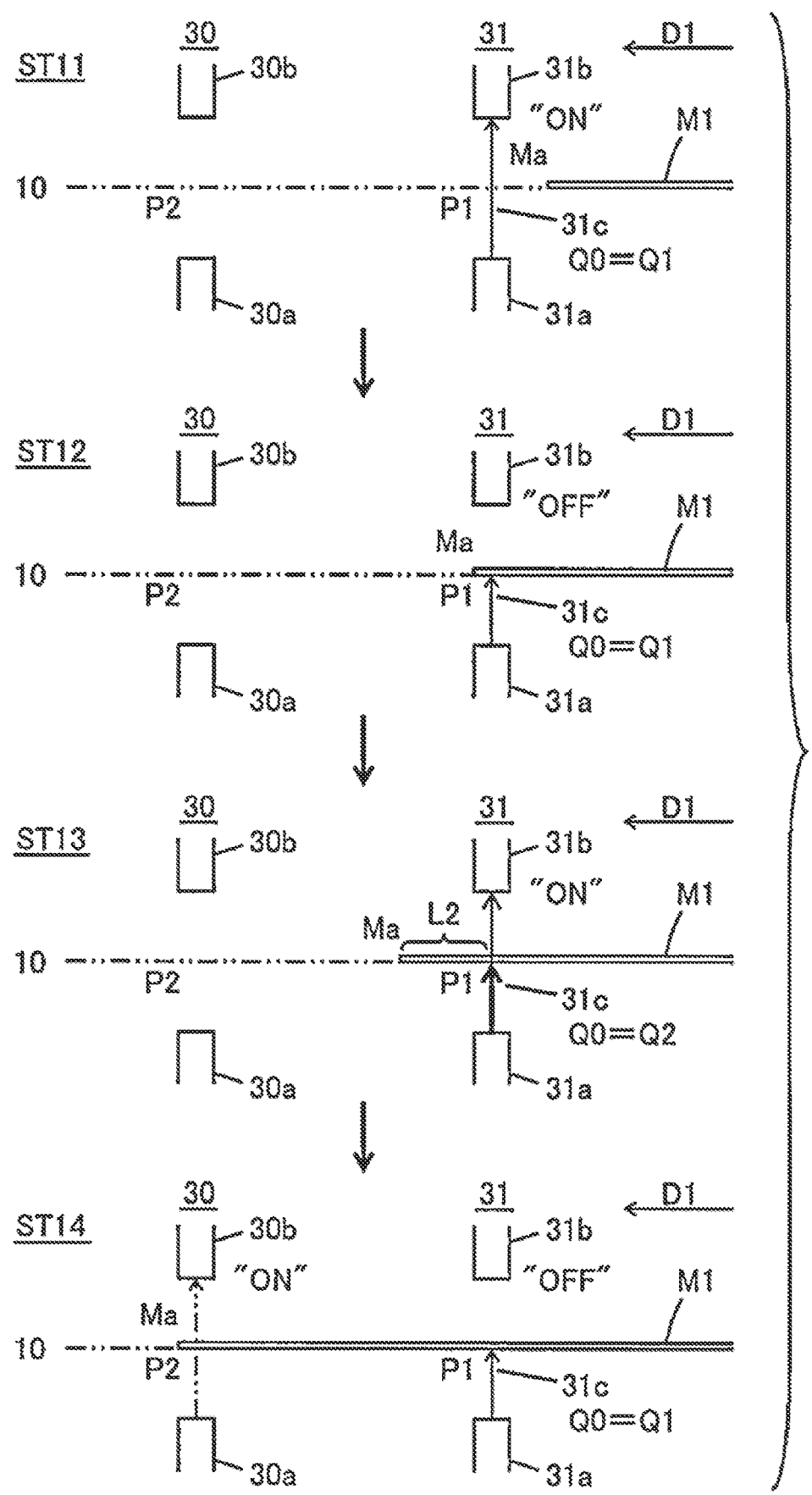
FIG. 6 schematically illustrates a control operation to be performed when a medium suitable for determining overlapping of media is fed.
Figure 7:
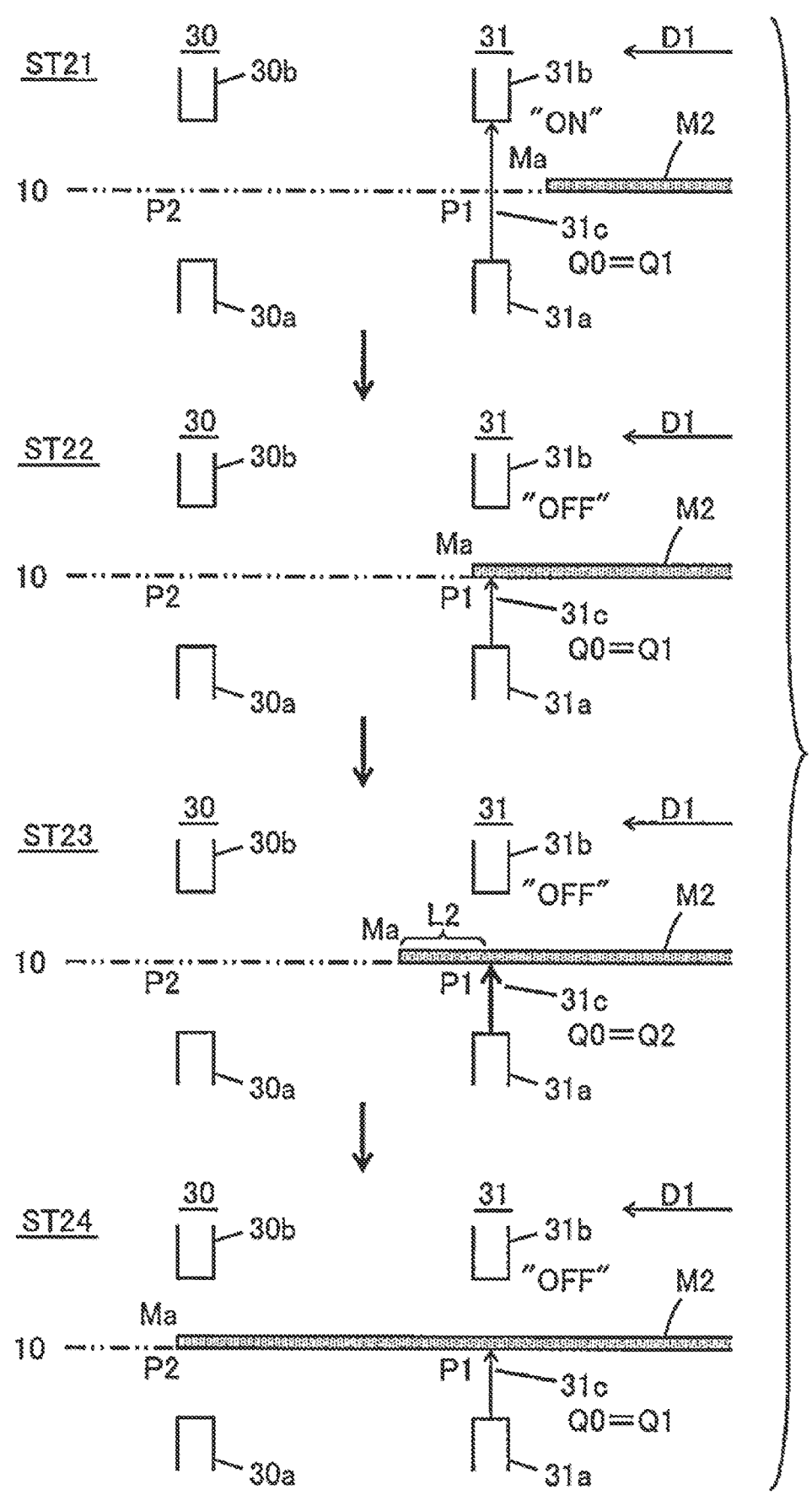
FIG. 7 schematically illustrates a control operation to be performed when a medium unsuitable for determining overlapping of media is fed.

In the above first aspect, when the optical medium detector 31 detects that a state where a medium M0 is absent is switched to a state where the medium M0 is present with a light quantity Q0 of the light transmitter 31a set to a first light quantity Q1, the controller 40 determines that the optical medium detector 31 has detected an upstream edge Ma of the medium M0 being fed. In response to the detection of the upstream edge Ma of the medium M0, the controller 40 switches the light quantity Q0 of the light transmitter 31a to a second light quantity Q2, which is larger than the first light quantity Q1. If the medium M0 is thick, the light 31c that would be received by the light receiver 31b is entirely blocked by the medium M0 as illustrated in FIG. 7, in which case a quantity (V1) of the light 31c received by the light receiver 31b does not exceed a threshold (Vth). If the medium M0 is not thick, the light 31c passes through the medium M0 and is received by the light receiver 31b as illustrated in FIG. 6, in which case the quantity (V1) of the light 31c received by the light receiver 31b exceeds the threshold (Vth). When the medium M0 is not thick, namely, when the quantity (V1) of the light 31c received by the light receiver 31b exceeds the threshold (Vth), the controller 40 determines whether the medium M0 overlaps another medium M0, based on a detection result of the multi-feed detector 30. However, when the medium M0 is thick, namely, when the quantity (V1) of the light 31c received by the light receiver 31b does not exceed the threshold (Vth), the controller 40 skips the determination of whether the medium M0 overlaps another medium M0. In this way, the medium detector 31, after having detected the presence of a medium M0, determines whether the medium M0 is a medium, such as a medium M1, suitable for determining overlapping of media or a medium, such as a card M2, unsuitable for determining overlapping of media. Consequently, the first aspect can provide an image reading apparatus that does not involve using a sensor dedicated to detecting thick media but is less likely to erroneously determine that media overlap each other independently of their thickness.

Examples of the above image reading apparatus include: scanners; facsimile machines; and multifunction products (MFPs) that scan documents and output image data. The above threshold used to determine whether a medium M0 is thick with the light quantity set to the second light quantity may be equal to or different from a threshold used to determine whether the medium M0 is present with the light quantity set to the first light quantity. The case where the quantity of the light received by the light receiver exceeds the threshold may correspond to the case where the light receiver detects the light emitted from the light transmitter. The case where the quantity of the light received by the light receiver does not exceed the threshold may correspond to the case where the light receiver does not detect the light emitted from the light transmitter. To skip the determination of whether media overlap each other, the controller 40 may disable the detecting function of the multi-feed detector or its determining function Examples of processes to be performed when media M0 overlap each other include a process of disabling a function of feeding media M0 and a process of disabling a function of reading images on media M0. When not determining that media M0 overlap each other, the controller 40 does not have to perform these processes. It should be noted that the above configurations and functions are applicable to the remaining aspects described below.

Second Aspect

Figure 8:
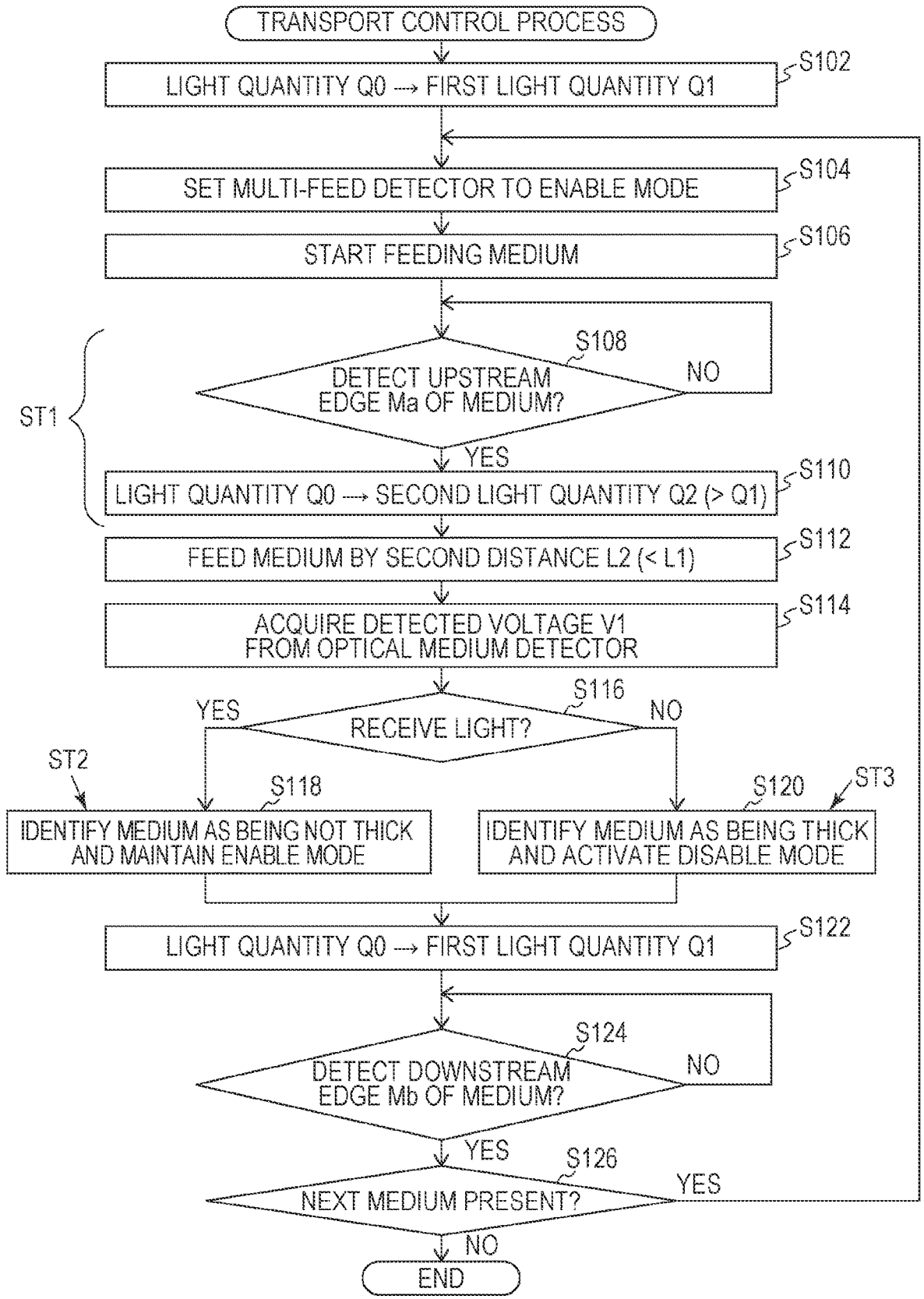
FIG. 8 is a schematic flowchart of a transport control process using the image reading apparatus.

According to a second aspect of the present technology, as illustrated in FIG. 8, after determining whether the quantity V1 of the light 31c received by the light receiver 31b exceeds the threshold Vth in response to switching of the light quantity Q0 from the first light quantity Q1 to the second light quantity Q2, the controller 40 may return the light quantity Q0 to the first light quantity Q1 and then, when the optical medium detector 31 detects that the state where the medium M0 is present is switched to the state where the medium M0 is absent, may determine that a downstream edge Mb of the medium M0 is passing through the medium detection location P1.

In the above second aspect, after having detected the upstream edge Ma of the medium M0, the optical medium detector 31 may detect the thickness of the medium M0 and then may detect the downstream edge Mb of the medium M0. Consequently, the second aspect can provide an image reading apparatus that does not involve using a sensor dedicated to detecting thick media but is less likely to erroneously determine that media overlap each other independently of their thickness.

Third Aspect

According to a third aspect of the present technology, as illustrated in FIGS. 8 and 9, the controller 40 may determine whether the quantity (V1) of the light 31c received by the light receiver 31b exceeds the threshold (Vth), after the optical medium detector 31 detects that the state where the medium M0 is absent is switched to the state where the medium M0 is present with the light quantity Q0 set to the first light quantity Q1 and before the medium M0 is fed by a first distance L1. Furthermore, the first distance may be equivalent to a size of a short side of a card defined in ID-1 of ISO/IEC 7810.

ISO stands for the International Organization for Standardization; IEC stands for the International Electrotechnical Commission. In the above third aspect, the image reading apparatus is less likely to erroneously determine that media overlap each other independently of their thickness. It should be noted that the feature in which the first distance L1 is different from a size S1 of the short side of the card defined in ID-1 is also included in the scope of the present technology although this feature is not included in the third aspect.

Fourth Aspect

According to a fourth aspect of the present technology, as illustrated in FIGS. 8 and 9, after the optical medium detector 31 detects that the state where the medium M0 is absent is switched to the state where the medium M0 is present with the light quantity Q0 set to the first light quantity Q1, when the medium is fed by a second distance L2, the controller 40 may determine whether the quantity (V1) of the light 31c received by the light receiver 31b exceeds the threshold (Vth), the second distance L2 being shorter than the first distance L1.

In the above fourth aspect, the controller 40 can accurately determine whether the medium M0 is a medium, such as a medium M1, suitable for determining overlapping of media or a medium, such as a card M2, unsuitable for determining overlapping of media. Consequently, the image reading apparatus does not involve using a sensor dedicated to detecting thick media but is less likely to erroneously determine that media overlap each other independently of their thickness.

Fifth Aspect

Figure 3:
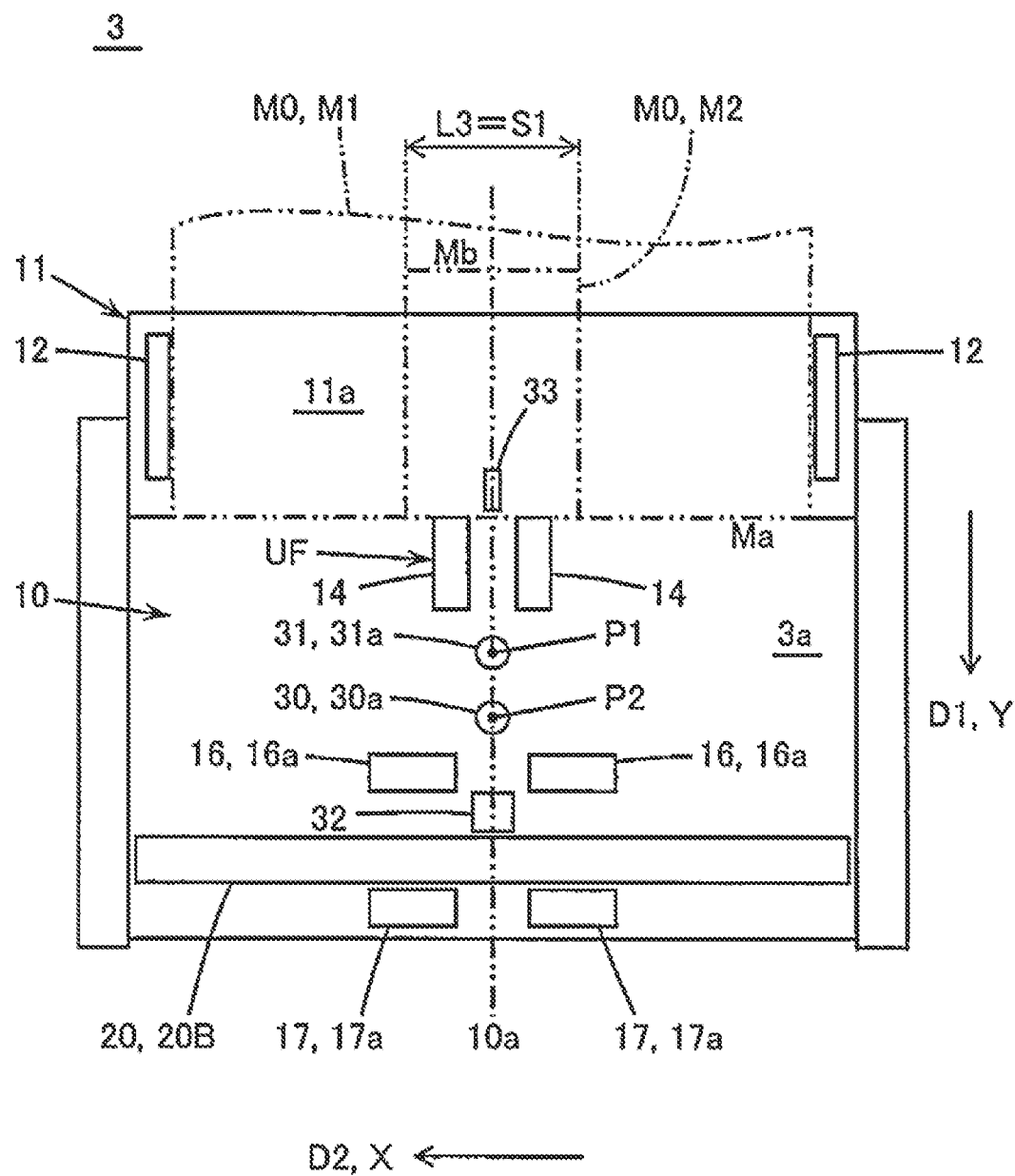
FIG. 3 schematically illustrates the transport surface of the lower unit in the image reading apparatus.

According to a fifth aspect of the present technology, as illustrated in FIG. 3, both the multi-feed detection location P2 and the medium detection location P1 may be positioned within an area having a third length L3 in a direction (e.g., width direction D2) orthogonal to the feeding direction D1, a center of the area coinciding with a central location 10a of the transport route 10 in the direction (e.g., width direction D2) orthogonal to the feeding direction D1. Furthermore, the third length L3 may be equivalent to a size S1 of a short side of a card defined in ID-1 of ISO/IEC 7810.

In the above fifth aspect, the image reading apparatus is less likely to erroneously determine whether media overlap each other independently of their thickness. It should be noted that the feature in which the third length L3 is different from the size S1 of the short side of the card defined in ID-1 is also included in the scope of the present technology although this feature is not included in the fifth aspect.

Sixth Aspect

Figure 2:
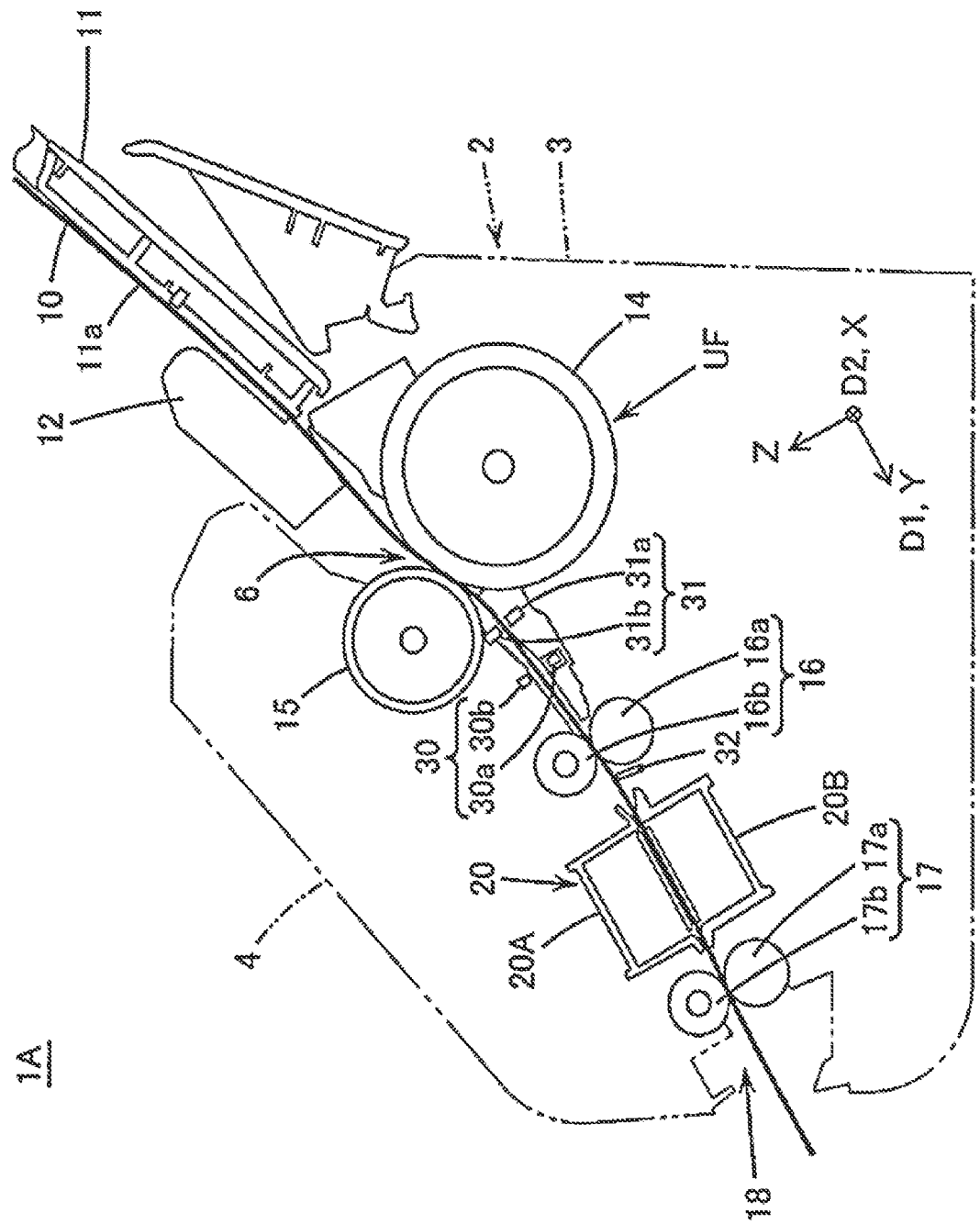
FIG. 2 is a schematic, vertical cross-sectional view of a transport route inside the image reading apparatus.

According to a fifth aspect of the present technology, as illustrated in FIGS. 1 and 2, the image reading apparatus (1A) may further include: a lower unit 3 disposed below the transport route 10; and an upper unit 4 disposed above the transport route 10, the upper unit being movable relative to the lower unit. The reader 20 may include a first reader (e.g., lower read sensor 20B) that reads an image on a lower surface of the medium M0 and a second reader (e.g., upper read sensor 20A) that reads an image on an upper surface of the medium M0, the first reader being disposed in the lower unit 3, the second reader being disposed in the upper unit 4. The multi-feed detector 30 may include a transmitter 30a and a receiver 30b, one of which is disposed in the lower unit 3 and the other of which is disposed in the upper unit 4. Of the light transmitter 31a and the light receiver 31b, one may be disposed in the lower unit 3, and the other may be disposed in the upper unit 4. When the upper unit 4 is disposed over the lower unit 3, the second reader (20A) may face the first reader (20B), the receiver (30b) may face the transmitter (30a), and the light receiver (31b) may face the light transmitter (31a).

The above sixth aspect provides an image reading apparatus that reads images on both surfaces of a medium appropriately.

Seventh Aspect

According to a seventh aspect of the present technology, as illustrated in FIG. 8, the controller 40 may switch the light quantity Q0 from the first light quantity Q1 to the second light quantity Q2 and from the second light quantity Q2 to the first light quantity Q1, in units of the media M0.

In the above seventh aspect, the controller 40 may determine whether each medium M0 is a medium, such as a medium M1, suitable for determining overlapping of media or a medium, such as a card M2, unsuitable for determining overlapping of media. Consequently, the seventh aspect appropriately provides an image reading apparatus that does not involve using a sensor dedicated to detecting thick media but is less likely to erroneously determine that media overlap each other independently of their thickness.

Eighth Aspect

According to an eighth aspect of the present technology, there is provided a method of controlling an image reading apparatus that includes the above feeder UF, multi-feed detector 30, reader 20, and optical medium detector 31. This method includes the following steps (A), (B), and (C):
(A) a first step ST1 of, when the optical medium detector 31 detects that a state where the medium M0 is absent is switched to a state where the medium M0 is present with the light quantity Q0 set to a first light quantity Q1, switching the light quantity Q0 from the first light quantity Q1 to a second light quantity Q2, the second light quantity Q2 being larger than the first light quantity Q1; (B) a second step ST2 of, when a quantity (V1) of the light 31c received by the light receiver 31b exceeds a threshold (Vth) in response to switching of the light quantity Q0 from the first light quantity Q1 to the second light quantity Q2, determining whether the medium M0 overlaps the another medium M0, based on the detection result of the multi-feed detector 30; and
(C) a third step ST3 of, when the quantity (V1) of the light 31c received by the light receiver 31b does not exceed the threshold (Vth) in response to the switching of the light quantity Q0 from the first light quantity Q1 to the second light quantity Q2, skipping determination of whether the medium M0 overlaps the another medium M0.

The above eighth aspect can provide a method of controlling an image reading apparatus which does not involve using a sensor dedicated to detecting thick media but is less likely to erroneously determine that media overlap each other independently of their thickness. It should be noted that the features of the above second to seventh aspects may be added to the feature of the eighth aspect.

The present technology is applicable to, for example, an image reading system including the above image reading apparatus, a method of controlling the image reading system, an image reading program that causes a computer to implement the functions performed by the controller, and a computer-readable medium that stores the image reading program.

Figure 4:
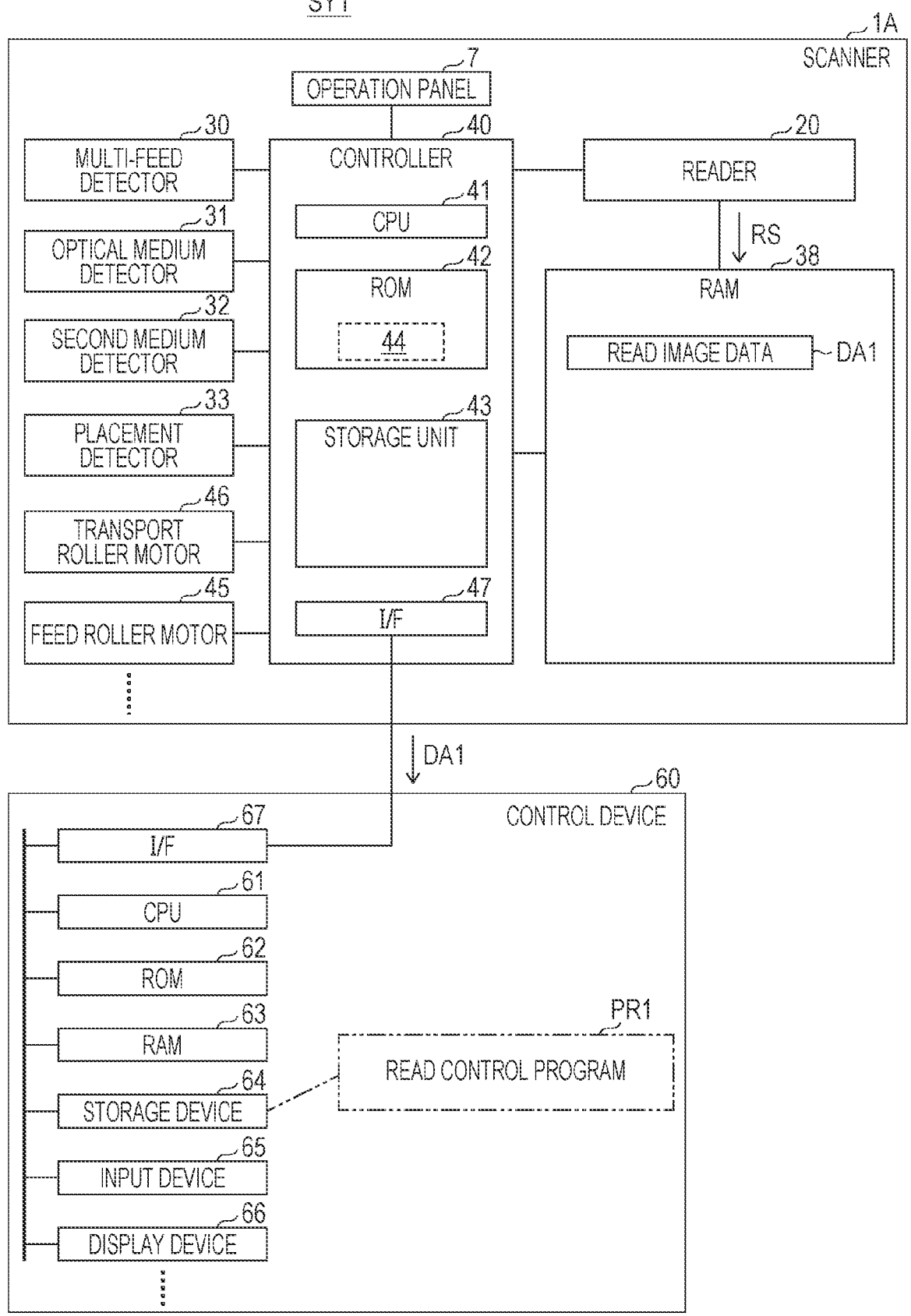
FIG. 4 is a schematic block diagram of a configuration of an image reading system including the image reading apparatus.

(2) Concrete Example of Configuration of Image Reading System Including Image Reading Apparatus FIG. 1 is a schematic, perspective view of the exterior of a scanner 1A, which is a concrete example of an image reading apparatus according to an embodiment of the present disclosure; FIG. 2 is a schematic, vertical cross-sectional view of a transport route 10 inside the scanner 1A; FIG. 3 schematically illustrates a transport surface 3a of a lower unit 3 in the scanner 1A; and FIG. 4 is a schematic block diagram of a configuration of an image reading system SY1 including the scanner 1A. As illustrated in FIG. 4, the image reading system SY1 includes the scanner 1A and a control device 60. The scanner 1A, as illustrated in FIGS. 1 and 2, may be a document scanner that automatically and sequentially feeds a plurality of media M0 and reads images on both surfaces of the media M0.

FIGS. 1 to 3 and some other drawings each employ an X-Y-Z coordinate system, in which the X-axis extends along the respective widths of the scanner 1A and a medium M0 placed in the scanner 1A, the Y-axis is orthogonal to the X-axis and extends in a transport direction of the medium M0, and the Z-axis is orthogonal to both the X and Y axes and substantially orthogonal to the upper and lower surfaces of the medium M0. The +Y direction denoted by the Y arrow is identical to a feeding direction D1 of the medium M0; and the +X direction denoted by the X-axis is identical to a width direction D2 of the transport route 10 for the medium M0. The X and Y axes do not have to be orthogonal as long as they intersect each other; the X and Z axes do not have to be orthogonal as long as they intersect each other; and the Y and Z axes do not have to be orthogonal as long as they intersect each other. The +Y-directional side corresponds to the front side of the scanner 1A, whereas the −Y-directional side corresponds to the rear side of the scanner 1A. In some cases, the −Y-directional side is referred to as the upstream side toward which the medium M0 is to be transported, whereas the +Y-directional side is referred to as the downstream side.

Referring to FIGS. 1 and 2, the scanner 1A includes a main body 2 in which a reader 20 reads an image on a medium M0. The main body 2 includes: the lower unit 3 disposed below the transport route 10 along which the medium M0 is to be transported; and an upper unit 4 disposed above the transport route 10. The upper unit 4 is pivotable around the axis on the downstream side of the lower unit 3 in the feeding direction. This axis may be implemented by a shaft that is disposed near the front side of the scanner 1A and extends along the X-axis. A user can expose the transport route 10 along which the medium M0 is to be transported by pivoting the upper unit 4 to the front side, so that it is possible to easily deal with the jamming of the medium M0. Then, the user can cover the transport route 10 with the upper unit 4 by pivoting the upper unit 4 to the lower unit 3. In short, by using the upper unit 4, the transport route 10 can be exposed or hidden.

The main body 2 includes a medium placement section 11 on the rear side, which has a placement surface 11a on which a medium M0 to be transported is placed. The medium placement section 11 is detachable from the main body 2. The medium placement section 11 has a pair of edge guides 12 and 12 that guides both edges of the medium M0 in the ±X directions, or the width directions, which intersect the +Y direction, or the feeding direction of the medium M0. In addition, the medium placement section 11 has a first medium support 8 and a second medium support 9, both of which can be retracted into the medium placement section 11 or pulled out therefrom as illustrated in FIG. 1. With the first medium support 8 and the second medium support 9, the length of the placement surface 11a is adjustable.

The main body 2 further includes an operation panel 7 on the front side of the upper unit 4, which realizes a user interface (UI) that can display various setting information and receive various user's operations. In this embodiment, the operation panel 7 may be a touch panel that includes an operation section through which the user can operate the scanner 1A and a display section that displays various information. The main body 2 further includes a supply slot 6 on the top of the upper unit 4, which leads to the interior of the main body 2. When placed in the medium placement section 11, a medium M0 is fed into the main body 2 through the supply slot 6 and transported to the reader 20. The main body 2 further includes an ejection tray 5 on the front side of the lower unit 3, via which the medium M0 is to be ejected to the outside.

Referring to FIG. 2, the transport route 10 may be the space defined by the lower unit 3 and the upper unit 4 and correspond to the path along which the medium M0 is to be transported. On the transport route 10, the medium placement section 11, two feed rollers 14 and 14, two separation rollers 15 and 15, an optical medium detector 31, a multi-feed detector 30, two transport roller pairs 16 and 16, a second medium detector 32, the reader 20, and two ejection roller pairs 17 are arranged in this order from the upstream side in the feeding direction D1. Furthermore, a placement detector 33 (see FIG. 3) that detects the presence of a medium M0 in the medium placement section 11 is disposed at the most upstream location of the transport route 10. The placement detector 33 may be a contact sensor. Further, the placement detector 33 may be a contact sensor with a lever and detects whether the medium M0 is present in the medium placement section 11, depending on the position of the lever.

The feed rollers 14 and 14 and the separation rollers 15 and 15 are disposed on the transport route 10 downstream of the medium placement section 11. All of the feed rollers 14 and 14 and the separation rollers 15 and 15 nip the medium M0 placed on the placement surface 11a therebetween and then feed it toward the reader 20. Each feed roller 14 is driven and rotated by a feed roller motor 45 (see FIG. 4). More specifically, each feed roller 14 rotates clockwise on the page of FIG. 2 by means of the rotation torque transmitted from the feed roller motor 45. When a plurality of media M0 are placed on the placement surface 11a of the medium placement section 11, only the lowermost one of the media M0 comes into contact with each feed roller 14. Thus, when a plurality of media M0 are placed on the placement surface 11a of the medium placement section 11 in the scanner LA, they are sequentially fed to the downstream side in order from the lowermost one. Each separation roller 15 rotates by means of the rotation torque transmitted from a transport roller motor 46 (see FIG. 4) via a torque limiter (not illustrated).

When no medium M0 or a first medium M0 is present between the feed rollers 14 and 14 and the separation rollers 15 and 15, the separation rollers 15 slip over the torque limiter and are rotated by the rotation of the corresponding feed rollers 14, independently of the rotation torque from the transport roller motor 46. In this case, each separation roller 15 rotates clockwise on the page of FIG. 2. Then, when a second medium M0 is interposed between the feed rollers 14 and 14 and the separation rollers 15 and 15 in addition to the first medium M0, the first and second media M0 slid over each other. In response, each separation roller 15 rotates counterclockwise on the page of FIG. 2 by means of the rotation torque transmitted from the transport roller motor 46, thereby suppressing the first and second media M0 from overlapping each other. Nevertheless, media M0 may overlap each other; therefore, a multi-feed detector 30 that detects overlapping of media M0 is disposed downstream of the separation rollers 15 and 15. In this embodiment, the combination of the medium placement section 11, the feed rollers 14 and 14, and the separation rollers 15 and 15 correspond to an example of a feeder UF that feeds media M0 in the feeding direction D1.

The transport roller pairs 16 and 16, the reader 20 that reads images on media M0, and the ejection roller pairs 17 and 17 are arranged on the transport route 10 downstream of the feed rollers 14 and 14. Each transport roller pair 16 includes: a transport drive roller 16a driven and rotated by the transport roller motor 46 (see FIG. 4); and a transport driven roller 16b rotated by the rotation of the transport drive roller 16a. After having been nipped between the feed rollers 14 and 14 and the separation rollers 15 and 15 and fed thereby to the downstream side, a medium M0 is nipped again in the transport roller pairs 16 and 16 and then fed to the reader 20 disposed downstream of the transport roller pairs 16 and 16.

The optical medium detector 31 is disposed on the transport route 10 between the feed rollers 14 and 14 and the transport roller pairs 16 and 16. As illustrated in FIG. 2, the optical medium detector 31 is an optical sensor that includes a light transmitter 31a and a light receiver 31b facing each other with the transport route 10 therebetween. The light transmitter 31a is disposed in the lower unit 3, whereas the light receiver 31b is disposed in the upper unit 4. When the upper unit 4 is placed over the lower unit 3, the light receiver 31b faces the light transmitter 31a. As illustrated in FIGS. 3 and 6 and some other drawings, the light transmitter 31a emits light 31c with a variable light quantity Q0 to a medium detection location P1 on the transport route 10 between the feeder UF and a multi-feed detection location P2. In this embodiment, the optical medium detector 31 includes a digital-to-analog (D/A) converter circuit that converts a digital signal indicating light quantity Q0 into an analog signal indicating the light quantity Q0. More specifically, when the optical medium detector 31 receives a digital signal indicating light quantity Q0 from a controller 40 (see FIG. 4), the D/A converter circuit converts the digital signal indicating the light quantity Q0 into an analog signal indicating the light quantity Q0 and then causes the light transmitter 31a to emit the light 31c with the light quantity Q0. Then, the light receiver 31b receives the light 31c that has traveled across the transport route 10 and transmits an electrical signal (detected voltage in this embodiment) indicating the quantity of the received light to the controller 40. In this embodiment, the optical medium detector 31 also includes an analog-to-digital (A/D) converter circuit that converts an analog detected voltage received by the light receiver 31b into a digital detected voltage. More specifically, when the light receiver 31b receives an analog detected voltage, the A/D converter circuit converts the analog detected voltage into a digital detected voltage and then transmits the digital detected voltage to the controller 40. When no medium M0 is present between the light transmitter 31a and the light receiver 31b, the light 31c emitted from the light transmitter 31a directly enters the light receiver 31b. In which case, the quantity of the light 31c received by the light receiver 31b exceeds a predetermined threshold. Then, when receiving the electrical signal from the light receiver 31b, the controller 40 determines that no medium is present at the medium detection location P1. When a medium M0 is present between the light transmitter 31a and the light receiver 31b with the light quantity Q0 set to a first light quantity Q1, the light 31c emitted from the light transmitter 31a is blocked by the medium M0, so that the quantity of the light 31c received by the light receiver 31b does not exceed the threshold. Then, the controller 40 receives the electrical signal and then determines that a medium is present at the medium detection location P1. In short, the timing when the optical medium detector 31 detects the state where a medium M0 is absent is switched to the state where the medium M0 is present corresponds to the timing when an upstream edge Ma of the medium M0 is passing through the medium detection location P1. The timing when the optical medium detector 31 detects the state where the medium M0 is present is switched to the state where the medium M0 is absent corresponds to the timing when a downstream edge Mb of the medium M0 is passing through the medium detection location P1.

Therefore, the controller 40 can know when the upstream edge Ma and downstream edge Mb of the medium M0 are passing through the medium detection location P1, based on the detection results of the optical medium detector 31.

The multi-feed detector 30 that detects overlapping of media M0 at the multi-feed detection location P2 (see FIG. 3) is disposed on the transport route 10 between the medium detection location P1 and each transport roller pair 16. Referring to FIG. 2, the multi-feed detector 30, which may be an ultrasonic sensor, includes a transmitter 30a and a receiver 30b facing each other with the transport route 10 therebetween. If a medium M0 is present between the transmitter 30a and the receiver 30b, ultrasonic waves emitted from the transmitter 30a are attenuated through the medium M0. This phenomenon is utilized for the multi-feed detector 30 to detect overlapping of media M0. The transmitter 30a is disposed in the lower unit 3, whereas the receiver 30b is disposed in the upper unit 4. When the upper unit 4 is placed over the lower unit 3, the transmitter 30a faces the receiver 30b and can emit ultrasonic waves to the multi-feed detection location P2. When receiving the ultrasonic waves that have traveled across the transport route 10, the receiver 30b transmits an electrical signal indicating the intensity of the received ultrasonic waves to the controller 40. In general, the attenuation of the ultrasonic waves through two or more media M0 is greater than the attenuation through a single medium M0. In this case, the intensity of the ultrasonic waves emitted from the transmitter 30a is set such that, when two or more media M1 are present between the transmitter 30a and the receiver 30b, the ultrasonic waves received by the receiver 30b do not exceed a predetermined threshold, each medium M1 being thinner than a card M2. Thus, when receiving the electrical signal in this state, the controller 40 determines that the media M1 overlap each other at the multi-feed detection location P2. However, when a single medium M1 is present between the transmitter 30a and the receiver 30b, the intensity of the ultrasonic waves received by the receiver 30b exceeds the threshold. When receiving the electrical signal in this state, the controller 40 determines that media M1 do not overlap each other at the multi-feed detection location P2. In this way, the controller 40 can determine whether media M1 overlap each other, based on an electrical signal transmitted from the receiver 30b.

The second medium detector 32, which may be a contact sensor, is disposed on the transport route 10 downstream of the transport roller pairs 16 and 16. The second medium detector 32, as illustrated in FIG. 2, is a contact sensor having a lever, which operates when the upstream edge Ma or the downstream edge Mb of a medium M0 passes through the second medium detector 32. In response, the second medium detector 32 changes an electrical signal and then transmits it to the controller 40. When the electrical signal transmitted from the second medium detector 32 changes, the controller 40 determines that the upstream edge Ma or the downstream edge Mb of a medium M0 is passing through the second medium detector 32. In this way, the controller 40 can know at which location on the transport route 10 a medium M0 is present, by using the above optical medium detector 31 and second medium detector 32.

The reader 20, which is disposed on the transport route 10 downstream of the second medium detector 32, includes: an upper read sensor 20A disposed in the upper unit 4; and a lower read sensor 20B disposed in the lower unit 3. When the upper unit 4 is placed over the lower unit 3, the upper read sensor 20A faces the lower read sensor 20B. The upper read sensor 20A reads an image on the upper surface of a medium M0 being fed and then outputs a read result RS to the controller 40. The lower read sensor 20B reads an image on the lower surface of the medium M0 being fed and outputs another read result RS to the controller 40. Herein, the lower read sensor 20B corresponds to an example of a first reader; the upper read sensor 20A corresponds to an example of a second reader. Each of the upper read sensor 20A and the lower read sensor 20B may be a contact image sensor module (CISM). In this way, the reader 20 can read an image on at least one surface of a medium M0. Details of this function of the reader 20 will be described later.

After having passed through the reader 20 on the transport route 10, the medium M0 is nipped in the ejection roller pairs 17 and 17 disposed downstream of the reader 20 and then ejected to the outside via an ejection slot 18 formed on the front side of the lower unit 3. Each ejection roller pair 17 includes: an ejection drive roller 17a driven and rotated by the transport roller motor 46 (see FIG. 4); and an ejection driven roller 17b rotated by the rotation of the ejection drive roller 17a.

Referring to FIG. 3, the placement detector 33, the feed rollers 14 and 14, the light transmitter 31a of the optical medium detector 31, the transmitter 30a of the multi-feed detector 30, the transport drive rollers 16a and 16a, the second medium detector 32, the reader 20, and the ejection drive rollers 17a and 17a are arranged on the transport surface 3a of the lower unit 3 in this order from the upstream side in the feeding direction D1. The feed rollers 14 and 14 are arranged symmetrically with respect to a central location 10a of the transport route 10. The central location 10a refers to the middle of the transport route 10 in the width direction D2, which is orthogonal to the feeding direction D1. The transport drive rollers 16a and 16a are arranged symmetrically with respect to the central location 10a. Likewise, the ejection drive rollers 17a and 17a are arranged symmetrically with respect to the central location 10a.

When a medium M0 is placed in the medium placement section 11, the center of the medium M0 in the width direction D2 is substantially aligned with the central location 10a of the transport route 10. In this case, the medium detection location P1, the multi-feed detection location P2, and the detection points of the placement detector 33 and the second medium detector 32 are all positioned within an area that is formed on the transport surface 3a so as to expand in the feeding direction D1 with its center coinciding with the central location 10a of the transport route 10 and that has a third length L3 in the width direction D2. In addition, the feed rollers 14 and 14, the transport drive rollers 16a and 16a, and the ejection drive rollers 17a and 17a are partly positioned within this area.

Media M0 to be scanned by the scanner 1A may be any kind of media such as media M1 and cards M2, the media M1 being larger than the cards M2, as long as they can be guided by the edge guides 12 and 12. Examples of the cards M2 include driver's licenses, health insurance cards, membership cards, cash cards, and credit cards, most of which are made of plastic and thicker than a standard-sized medium such as an A4-sized medium. The international standard ISO/IEC 7810 defines the shapes and sizes of identification cards. Of the sizes of identification cards that can be scanned by the scanner 1A, the minimum one conforms to ID-1 of ISO/IEC 7810, which specifies that the long side is 85.60 mm long and the short side is 53.98 mm long. To scan a card M2 with the scanner 1A, a user usually places the card M2 in a portrait orientation in the medium placement section 11, as illustrated in FIG. 3. Therefore, the third length L3 is set to 53.98 mm, which is the same as the size S1 of the short side of the card defined in ID-1 of ISO/IEC 7810.

Referring to FIG. 4, the scanner 1A includes: the controller 40; and random-access memory (RAM) 38, which may be formed of a semiconductor memory. The controller 40 controls various operations of the scanner 1A, including feeding and scanning of a medium M0. When receiving an instruction signal from a user through the operation panel 7, the controller 40 transmits a signal for displaying predetermined information or realizing the UI to the operation panel 7. In addition, the controller 40 controls both the feed roller motor 45 and the transport roller motor 46; the feed roller motor 45 serves as the drive source for the feed rollers 14 and 14; the transport roller motor 46 serves as the drive source for the separation rollers 15 and 15, the transport roller pairs 16 and 16, and the ejection roller pairs 17 and 17. Furthermore, the controller 40 receives detection signals from the multi-feed detector 30, the optical medium detector 31, the second medium detector 32, and the placement detector 33 and performs necessary control operations, based on those detection signals. Further, the controller 40 performs control operations, based on the detection results of the multi-feed detector 30 and the optical medium detector 31. Moreover, the controller 40 transmits a control signal to the reader 20, and in turn receives read image data DA1 based on the read results RS from the reader 20 and stores it in the RAM 38, which serves as a buffer.

The controller 40 includes a central processing unit (CPU) 41 formed of a processor, read-only memory (ROM) 42 formed of a semiconductor memory, a storage unit 43, and an interface (I/F) 47. The ROM 42 stores a plurality of programs 44 for use in realizing various functions of the scanner 1A. The ROM 42 may be a semiconductor memory to which the programs 44 and data are writable. Alternatively, the programs 44 may be stored in the storage unit 43. In this case, the controller 40 may read the programs 44 from the storage unit 43 and may expand and execute them in the RAM 38. The programs 44 include a UI program for use in controlling the operation panel 7, a transport control program for use in performing a transport control process as illustrated in FIG. 8, and other control programs for use in reading an image on a medium M0. The storage unit 43 may be nonvolatile memory to which data is writable and from which data is readable. The storage unit 43 may be nonvolatile semiconductor memory such as flash memory or a magnetic storage device such as a hard disk. The CPU 41 performs various arithmetic processes in accordance with the programs 44, thereby controlling all operations of the scanner 1A. The I/F 47 is connected to an I/F 67 in the control device 60 and communicates with the I/F 67 in conformity with a predetermined communication standard to, for example, transmit the read image data DA1 to the control device 60 and receive various information from the control device 60.

The control device 60, which is connected to the scanner 1A, includes a CPU 61 formed of a processor, a ROM 62 and a RAM 63 each formed of a semiconductor memory, a storage device 64, an input device 65, a display device 66, and the I/F 67. The components 61 to 67 are electrically connected together; thus, one component can transmit or receive information to/from another.

The storage device 64 stores a read control program PR1 for use in controlling an operating system (OS) (not illustrated) and the scanner 1A and other information. The control device 60 reads information from the storage device 64 and expands it in the RAM 63 to perform various processes, as appropriate. The storage device 64 may be a magnetic storage device such as a hard disk or nonvolatile semiconductor memory such as flash memory. The input device 65 may be a pointing device, hardware keys such as those in a keyboard, or a touch panel attached to the surface of a display panel. The display device 66 may be a liquid crystal panel. Both of the input device 65 and the display device 66 constitute a UI for the control device 60. The I/F 67, which is connected to the I/F 47 of the scanner 1A, communicates with the I/F 47 in conformity with a predetermined communication standard to, for example, transmit various information to the scanner 1A and, in turn, receive the read image data DA1 from the scanner 1A.

Figure 5:
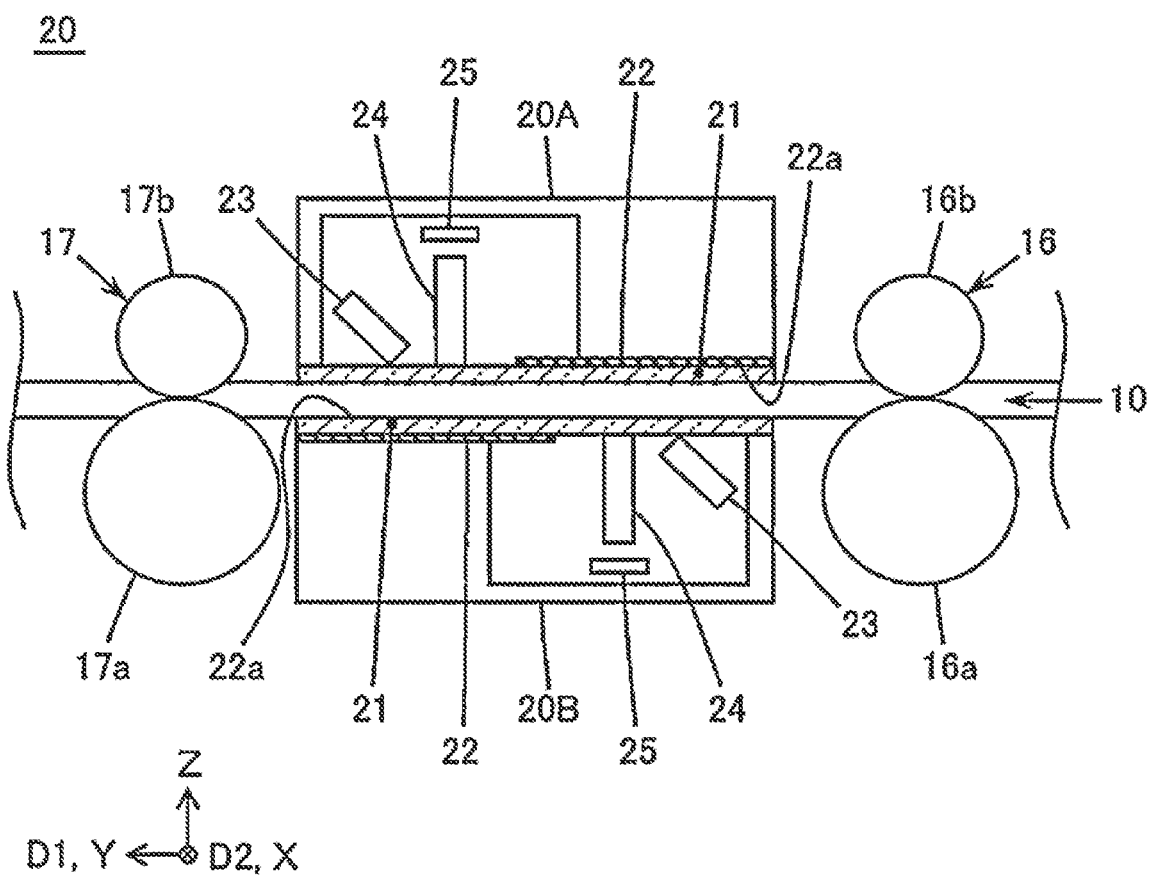
FIG. 5 schematically illustrates a configuration of the reader in the image reading apparatus.

FIG. 5 schematically illustrates a configuration of the reader 20. As illustrated in FIG. 5, an upper read sensor 20A and a lower read sensor 20B, which constitute the reader 20, are arranged symmetrically with respect to the point. It should be noted that the description given below is focused only on a configuration of the lower read sensor 20B because the basic configuration of the upper read sensor 20A is substantially the same as that of the lower read sensor 20B.

The lower read sensor 20B includes a light-transmitting plate 21, a reference plate 22, a light guide 23, a lens 24, and a line sensor 25. All of the lower read sensor 20B, the light-transmitting plate 21, the reference plate 22, the light guide 23, the lens 24, and the line sensor 25 are elongated in the width direction D2.

The light-transmitting plate 21 may be a resin plate made of colorless and transparent glass or acrylic. The outer surface of the light-transmitting plate 21 which faces the upper read sensor 20A is a read surface through which an image on a medium M0 is to be read. This outer surface partly forms the transport route 10 for the medium M0. The reference plate 22 is to be read by a line sensor 25 of the upper read sensor 20A facing the lower read sensor 20B for the sake of shading compensation. The reference plate 22 has a read reference plane 22a facing the upper read sensor 20A. The reference plate 22 may be a white, grey, and black resin or metal plate.

The light guide 23 is a light guide member that guides light to a medium M0 or a reference plate 22 of the upper read sensor 20A. More specifically, the light guide 23 guides light emitted in the width direction D2 from a light source (not illustrated) to the upper read sensor 20A. This light source may be one or more light-emitting diodes (LEDs) or a fluorescent lamp. When the upper read sensor 20A is irradiated with the light through the light guide 23, the light is reflected on the medium M0 or the read reference plane 22a of the upper read sensor 20A. Then, the light reaches the line sensor 25 through the lens 24, and its intensity is measured by the line sensor 25. The line sensor 25 includes a plurality of photoelectric conversion elements arrayed in the width direction D2 at a predetermined density, such as at 300 to 600 dots per inch (dpi). Each photoelectric conversion element may be a photodiode. One of the photoelectric conversion elements is related to a corresponding pixel. The line sensor 25 transmits measurements obtained by the photoelectric conversion elements to the RAM 38 as the read result RS. The line sensor 25 may be a complementary metal-oxide semiconductor (CMOS) image sensor, a photometric sensor formed of a charge-coupled device (CCD), or a solid-state image sensing device called an area sensor.

(3) Concrete Example of Transport Control Process

When cards M2, as illustrated in FIG. 3, are transported in the scanner 1A, the controller 40 may erroneously determine that the cards M2 overlap each other, because the cards M2 are thicker than standard-sized media such as A4-sized media. When determining that cards M2 overlap each other, the controller 40 discontinues performing the reading operation and no longer reads an image on the cards M2 being fed. Thus, to read images on such thick media with the scanner 1A, a user first needs to operate the overlap-detection disable switch on the operation panel 7 and then to operate the start switch thereon. However, this procedure may be somewhat inconvenient for the user. Therefore, when both media M1 having a standard size and thickness and cards M2 having a small size and large thickness are placed in the medium placement section 11, it is preferable for the controller 40 to first determine whether the media M1 overlap each other and then to skip the determination of whether the cards M2 overlap each other, in terms of the operational efficiency. For that purpose, a sensor that detects thick media is preferably disposed on the transport route 10 upstream of the multi-feed detector 30 in the feeding direction D1; however, this configuration may result in cost increase. Thus, an existing sensor may be used to detect thick media, and the controller 40 may disable the multi-feed detector 30 from detecting overlapping of media when this sensor detects a thick medium.

In this embodiment, the optical medium detector 31, which is disposed upstream of the multi-feed detector 30 in the feeding direction D1, is used to detect thick media such as cards M2. In this embodiment, the optical medium detector 31 detects the passage of the upstream edges Ma and downstream edges Mb of media M0 in the above manner and further detects whether media M0 are thick during other periods by utilizing the light-transmitting property of the media M0. When the optical medium detector 31 detects that media M0 are thick, the controller 40 disables the multi-feed detector 30 from detecting overlapping of media.

During the reading operation, the light transmitter 31a of the optical medium detector 31 continues to emit light with a light quantity suitable for detecting the passage of the upstream edges Ma and downstream edges Mb of media M0. This light quantity may be a constant that has been determined during a pre-shipment process. In this embodiment, after having detected the upstream edge Ma of a medium M0, the controller 40 switches this light quantity to a light quantity suitable for detecting a thick medium and then determines whether the medium M0 is thick. After that, the controller 40 returns this light quantity to the previous light quantity and then detects the downstream edge Mb of the medium M0. The light quantity suitable for detecting the passage of the upstream edge Ma and the downstream edge Mb may be determined such that the light from the light transmitter 31a reaches the light receiver 31b when no medium M1 is present at the medium detection location P1 but does not reach the light receiver 31b when a medium M1 is present at the medium detection location P1. Further, this light quantity may be determined such that the light does not reach the light receiver 31b when the thinnest one of media supported by the scanner 1A is present at the medium detection location P1. In this embodiment, the controller 40 can determine whether a medium M0 is thick by adjusting the light quantity of the light from the light transmitter 31a such that the light does not reach the light receiver 31b when a thick medium, such as a card M2, is present at the medium detection location P1 but such that it reaches the light receiver 31b when a thin medium, such as a medium M1, is present at the medium detection location P1.

FIG. 6 schematically illustrates a control operation to be performed when a medium M1 suitable for determining overlapping of media is fed. In this case, the light quantity Q0 suitable for detecting the passage of the upstream edge Ma and downstream edge Mb of a medium M0 is referred to as the first light quantity Q1, whereas the light quantity Q0 suitable for detecting a thick medium is referred to as the second light quantity Q2 (Q2>Q1).

In a state ST11, the upstream edge Ma of the medium M1 has not yet reached the medium detection location P1, while the light transmitter 31a is emitting the light 31c with the first light quantity Q1 to the medium detection location P1. When the light 31c enters the light receiver 31b, the light receiver 31b sets the detection result to "ON", which indicates that no medium is present at the medium detection location P1.

In a state ST12, the upstream edge Ma of the medium M1 being fed in the feeding direction D1 has just passed through the medium detection location P1, while the light 31c with the first light quantity Q1 emitted from the light transmitter 31a is being blocked by the medium M1. Since the light 31c does not enter the light receiver 31b, the light receiver 31b sets the detection result to "OFF", which indicates that a medium is present at the medium detection location P1. In this case, since the medium detector 31 detects that the state where a medium is absent is switched from to the state where the medium is present, the controller 40 determines that the optical medium detector 31 detects the upstream edge Ma of the medium M1. When the optical medium detector 31 detects the upstream edge Ma of the medium M1, the controller 40 increases the light quantity Q0 of the light emitted from the light transmitter 31a from the first light quantity Q1 to the second light quantity Q2.

In a state ST13, as illustrated in FIG. 6, the upstream edge Ma of the medium M1 has been fed by a second distance L2 from the medium detection location P1. In the state ST13, the light 31c with the second light quantity Q2 which has been emitted from the light transmitter 31a to the medium detection location P1 passes through the medium M1 and enters the light receiver 31b. As a result, the light receiver 31b sets the detection result to "ON", which indicates that the medium M1 is present at the medium detection location P1. In this case, the controller 40 enables the multi-feed detector 30 to detect overlapping of media.

In a state ST14, the upstream edge Ma of the medium M1 being fed in the feeding direction D1 has just passed through the multi-feed detection location P2, while the transmitter 30a of the multi-feed detector 30 is emitting ultrasonic waves to the multi-feed detection location P2. Since the ultrasonic waves are not greatly attenuated through the medium M1, the receiver 30b sets the detection result to "ON", which indicates that media do not overlap each other. However, if the medium M1 as illustrated in FIG. 6 reaches the multi-feed detection location P2 while overlapping another medium, the ultrasonic waves are greatly attenuated through those media. In this case, the receiver 30b sets the detection result to "OFF", which indicates that media overlap each other.

FIG. 7 schematically illustrates a control operation to be performed when a card M2 unsuitable for determining overlapping of media is fed.

In a state ST21, the upstream edge Ma of the card M2 has not yet reached the medium detection location P1, while the light transmitter 31a is emitting the light 31c with the first light quantity Q1 to the medium detection location P1. When the light 31c enters the light receiver 31b, the light receiver 31b sets the detection result to "ON", which indicates that no medium is present at the medium detection location P1.

In a state ST22, the upstream edge Ma of the card M2 being fed in the feeding direction D1 has just passed through the medium detection location P1, while the light 31c with the first light quantity Q1 emitted from the light transmitter 31a is being blocked by the card M2. Since the light 31c does not enter the light receiver 31b, the light receiver 31b sets the detection result to "OFF", which indicates that a medium is present at the medium detection location P1. In this case, since the optical medium detector 31 detects that the state where a medium is present is switched to the state where the medium is absent, the controller 40 determines that the optical medium detector 31 detects the upstream edge Ma of the card M2. When the optical medium detector 31 detects the upstream edge Ma of the card M2, the controller 40 increases the light quantity Q0 of the light emitted from the light transmitter 31a from the first light quantity Q1 to the second light quantity Q2.

In a state ST23, as illustrated in FIG. 7, the upstream edge Ma of the card M2 has been fed by the second distance L2 from the medium detection location P1. In the state ST23, the light 31c with the second light quantity Q2 which has been emitted from the light transmitter 31a to the medium detection location P1 is being blocked by the card M2. As a result, the light receiver 31b sets the detection result to "OFF", which indicates that the card M2 is present at the medium detection location P1. In this case, the controller 40 disables the multi-feed detector 30 from detecting overlapping of media.

In a state ST24, the upstream edge Ma of the card M2 being fed in the feeding direction D1 has just passed through the multi-feed detection location P2. In this case, the multi-feed detector 30 does not detect overlapping of media. Accordingly, the transmitter 30a stops emitting the ultrasonic waves. Alternatively, the transmitter 30a may continue to emit the ultrasonic waves, but the controller 40 may stop determining overlapping of media.

FIG. 8 schematically illustrates a transport control process that realizes the above transport control. During this transport control process, the controller 40 performs three steps: a first step ST1 (Steps S108 and S110), a second step ST2 (Step S118), and a third step ST3 (Step S120). FIG. 9 schematically illustrates the control process depending on the location of a medium M0 being fed. In FIG. 9, the solid line indicates a card M2 being fed when the upstream edge Ma is at the medium detection location P1, and the alternate long and two short dashes line indicates the card M2 being further fed.

The transport control process starts with Step S102 at which the controller 40 sets the light quantity Q0 of the light emitted from the light transmitter 31a to the first light quantity Q1, which is used to detect the upstream edge Ma of a medium M0. At Step S104, the controller 40 sets the multi-feed detector 30 to the enabled mode. In the enabled mode, the controller 40 continues to perform the reading operation unless the detection result of the multi-feed detector 30 indicates that media overlap each other; however, when the detection result of the multi-feed detector 30 indicates that media overlap each other, the controller 40 discontinues performing the reading operation. More specifically, in the enabled mode, the controller 40 determines whether media M0 overlap each other, based on the detection result of the multi-feed detector 30 and then performs a process in accordance with the determination result.

At Step S106 following Step S104, the controller 40 starts feeding the medium M0 in the feeding direction D1 from the medium placement section 11 by driving both the feed roller motor 45 and the transport roller motor 46 (see FIG. 4). After Step S106, the transport control process enters the state ST11 in FIG. 6 or the state ST21 in FIG. 7. At Step S108, the controller 40 continues to feed the medium M0 until the optical medium detector 31 has detected the upstream edge Ma of the medium M0 at the medium detection location P1, namely, until the detection result of the optical medium detector 31 has indicated that the state where the medium M0 is absent is switched to the state where the medium M0 is present. During the process at Step S108, the controller 40 may repeatedly acquire detection results from the optical medium detector 31 until the state where the medium M0 is absent has been switched to the state where the medium M0 is present. Alternatively, the controller 40 may receive a report from the optical medium detector 31 at the timing when the state where the medium M0 is absent is switched to the state where the medium M0 is present. After the optical medium detector 31 has detected the upstream edge Ma of the medium M0, the transport control process enters the state ST12 in FIG. 6 or the state ST22 in FIG. 7.

When the optical medium detector 31 detects the upstream edge Ma of the medium M0 (Yes at Step S108), at Step S110, the controller 40 sets the light quantity Q0 of the light transmitter 31a to the second light quantity Q2, which is larger than the first light quantity Q1. In short, when the optical medium detector 31 detects that the state where the medium M0 is absent is switched to the state where the medium M0 is present with the light quantity Q0 set to the first light quantity Q1, the controller 40 increases the light quantity Q0 to the second light quantity Q2. In FIG. 9, a distance that is traveled from the medium detection location P1 in the feeding direction D1 by the amount equivalent to a size S1 (53.98 mm) of the short side of the card defined in ID-1 of ISO/IEC 7810 is referred to as a first distance L1. In addition, a distance that is also traveled from the medium detection location P1 in the feeding direction D1 but is shorter than the first distance L1 is referred to as a second distance L2. In this case, the controller 40 needs to set the light quantity Q0 to the second light quantity Q2, after the upstream edge Ma of the medium M0 has been detected and before the medium M0 is fed by the second distance L2.

After having set the light quantity Q0 to the second light quantity Q2, at Step S112, the controller 40 feeds the medium M0 by the second distance L2 from the medium detection location P1 by driving both the feed roller motor 45 and the transport roller motor 46. After Step S112, the transport control process enters the state ST13 in FIG. 6 or the state ST23 in FIG. 7. After the entry in the state ST13 or ST23, at Step S114, the controller 40 acquires, from the optical medium detector 31, a detected voltage V1 that indicates the quantity of the light 31c received by the light receiver 31b. The purpose of performing the process at Step S112 is, for example, to compensate for a time required for the switching of the light quantity Q0 of the light transmitter 31a from the first light quantity Q1 to the second light quantity Q2 or the delay time to detect the upstream edge of the medium when a transparent document holder containing an original document is used as a medium. After having the detected voltage V1, at Step S116, the controller 40 determines whether the light receiver 31b receives the light 31c with the second light quantity Q2 from the light transmitter 31a, based on the detected voltage V1. Then, the controller 40 selects which process flow is to be performed, depending on the determination result. More specifically, at Step S116, the controller 40 may determine whether the detected voltage V1 exceeds a threshold Vth, as illustrated in FIG. 9, the threshold Vth being a value to be compared with the quantity of the light 31c received by the light receiver 31b.

As described above, the optical medium detector 31 detects that a state where a medium M0 is absent is switched to a state where the medium M0 is present at the medium detection location P1 with the light quantity Q0 set to the first light quantity Q1. After the detection, the controller 40 feeds the medium M0 by the second distance L2, which is shorter than the first distance L1. Then, the controller 40 determines whether the quantity of the light 31c received by the light receiver 31b exceeds the threshold Vth. This determination may be made with the light quantity Q0 of the light transmitter 31a set to the second light quantity Q2. Since the first distance L1 is equivalent to the size S1 of the short side of the card defined in ID-1 of ISO/IEC 7810, the controller 40 needs to determine whether the quantity of the light 31c received by the light receiver 31b exceeds the threshold Vth, after the detection of the upstream edge Ma of the medium M0 and before the feeding of the medium M0 by the distance equivalent to the size S1 of the short side of the medium M0, or by the first distance L1.

When the light receiver 31b detects the light 31c with the second light quantity Q2 from the light transmitter 31a as in the state ST13 illustrated in FIG. 6 (YES at S116), the detected voltage V1 exceeds the threshold Vth. In response, the controller 40 proceeds to Step S118, at which it identifies the detected medium M0 as a medium having a standard (thin) thickness, such as a medium M1, and maintains the enabled mode in which the controller 40 detects whether media overlap each other. When the detection result of the multi-feed detector 30 indicates that media M1 overlap each other, the controller 40 that operates in the enabled mode discontinues performing the reading operation. When the detection result of the multi-feed detector 30 does not indicate that media M1 overlaps each other, the controller 40 continues to perform the reading operation. In short, the controller 40 determines whether media M1 overlap each other, based on the detection result of the multi-feed detector 30 and then performs a process in accordance with the determination result.

When the light receiver 31b does not detect the light 31c with the second light quantity Q2 from the light transmitter 31a as in the state ST23 illustrated in FIG. 7 (NO at S116), the detected voltage V1 does not exceed the threshold Vth. In response, the controller 40 proceeds to Step S120, at which it identifies the detected medium M0 as a thick medium, such as a card M2, and activates the disabled mode in which the multi-feed detector 30 does not detect whether media overlap each other. In the disabled mode, the controller 40 disables the multi-feed detector 30 from detecting overlapping of media. Thus, the controller 40 skips the determination of whether media M0 overlap each other when a medium M0 being fed is so thick that the multi-feed detector 30 may fail to detect the overlapping accurately. At Step S120, the multi-feed detector 30 may continue to detect overlapping of media, in which case the controller 40 may ignore the detection result of the multi-feed detector 30 and continue to perform the reading operation. In any case, the controller 40 does not determine that media M0 overlap each other unless the quantity of the light 31c received by the light receiver 31b exceeds the threshold Vth, even after the light quantity Q0 has been switched from the first light quantity Q1 to the second light quantity Q2.

In the above way, the controller 40 uses the optical medium detector 31 to identify whether a medium M0 being fed is a medium having a standard thickness, such as a medium M1, suitable for detecting overlapping of media or a thick medium, such as a card M2, unsuitable for detecting overlapping of media. When identifying the medium M0 as the medium M1, the controller 40 determines whether media M1 overlap each other, based on the detection result of the multi-feed detector 30 and then performs a process in accordance with the detection result. When identifying the medium M0 as the card M2, the controller 40 skips the determination of whether cards M2 overlap each other. In this embodiment, the controller 40 does not involve using a sensor dedicated to detecting thick media but is less likely to erroneously determine that media overlap each other independently of their thickness.

At Step S122 following Step S118 or S120, the controller 40 returns the light quantity Q0 of the light transmitter 31a to the first light quantity Q1, which is used to detect the downstream edge Mb of the medium M0. As described above, the controller 40 increases the light quantity Q0 from the first light quantity Q1 to the second light quantity Q2 and then determines whether the quantity of the light 31c received by the light receiver 31b exceeds the threshold Vth. After that, the controller 40 decreases the light quantity Q0 of the light transmitter 31a to the first light quantity Q1. As illustrated in FIG. 9, the controller 40 needs to set the light quantity Q0 to the first light quantity Q1, after the light receiver 31b has detected the upstream edge Ma of the medium M0 and before the medium M0 is fed by the first distance L1.

After having returned the light quantity Q0 to the first light quantity Q1, at Step S124, the controller 40 continues to feed the medium M0 until the optical medium detector 31 has detected the downstream edge Mb of the medium M0 at the medium detection location P1, namely, until the detection result of the medium detector 31 has indicated that a state where the medium M0 is present is switched to a state where the medium M0 is absent. During the process at Step S124, the controller 40 may repeatedly acquire detection results from the optical medium detector 31 until the state where the medium M0 is present has been switched to the state where the medium M0 is absent. Alternatively, the controller 40 may receive a report from the optical medium detector 31 at the timing when the state where the medium M0 is present is switched to the state where the medium M0 is absent. The state where the multi-feed detector 30 has just detected the downstream edge Mb of the medium M0 corresponds to the state ST14 illustrated in FIG. 6 or the state ST24 illustrated in FIG. 7.

As described above, the controller 40 returns the light quantity Q0 from the second light quantity Q2 to the first light quantity Q1. Then, when the optical medium detector 31 detects that the state where the medium M0 is present is switched to the state where the medium M0 is absent, the controller 40 determines that the downstream edge Mb of the medium M0 is passing through the medium detection location P1. In this embodiment, the optical medium detector 31 detects the upstream edge Ma of the medium M0, the thickness of the medium M0, and the downstream edge Mb of the medium M0 in this order.

After having detected the downstream edge Mb of the medium M0, at Step S126, the controller 40 determines whether the next medium M0 is present, based on the detection result of the placement detector 33 (see FIG. 3 or 4) and then selects which process flow is to be performed, depending on the determination result. At Step S126, when the placement detector 33 does not detect the presence of a medium M0 (No at Step S126), the controller 40 terminates the transport control process. When the placement detector 33 detects the presence of a medium M0 (Yes at Step S126), the controller 40 may return to Step S104. In this case, the controller 40 repeats the processes at Steps S104 to S126. More specifically, the controller 40 repeats the process of: switching the light quantity Q0 from the first light quantity Q1 to the second light quantity Q2 and from the second light quantity Q2 to the first light quantity Q1, in units of media M0. In this way, the controller 40 identifies whether a medium M0 being fed is a medium having a standard thickness, such as a medium M1, suitable for determining overlapping of media or a thick medium, such as a card M2, unsuitable for determining overlapping of media.

In this embodiment, the controller 40 does not involve using a sensor dedicated to detecting thick media but is less likely to erroneously determine that media overlap each other independently of their thickness.

(4) Modifications

Some conceivable modifications of the foregoing embodiment of the present disclosure will be described below. Although the scanner 1A is configured to read both surfaces of a medium M0 in the foregoing embodiment, it may be configured to scan only one surface thereof. In this case, one of the upper read sensor 20A and the lower read sensor 20B does not have to be disposed in the scanner 1A. In the embodiment, the transmitter 30a of the multi-feed detector 30 is disposed in the lower unit 3, and the receiver 30b thereof is disposed in the upper unit 4; alternatively, the receiver 30b may be disposed in the lower unit 3, and the transmitter 30a may be disposed in the upper unit 4. Likewise, in the embodiment, the light transmitter 31a of the optical medium detector 31 is disposed in the lower unit 3, and the light receiver 31b thereof is disposed in the upper unit 4; alternatively, the light receiver 31b may be disposed in the lower unit 3, and the light transmitter 31a may be disposed in the upper unit 4. In the embodiment, the controller 40 acquires the detected voltage V1 from the optical medium detector 31; alternatively, it may receive, from the optical medium detector 31, a signal indicating whether the light receiver 31b receives the light 31c. In this case, the state where the light receiver 31b receives the light 31c corresponds to the state where the quantity of the light received by the light 31c is more than a predetermined value. The state where the light receiver 31b does not receive the light 31c corresponds to the state where the quantity of the light received by the light 31c is equal to or less than the value.

The above transport control process may be modified, for example, by altering the sequence of the steps as appropriate. In FIG. 8, the order of Step S104 at which the controller 40 sets the multi-feed detector 30 to the enabled mode may be swapped with the order of Step S106 at which the controller 40 starts feeding a medium M0. In addition, the quantity of the light used to detect the downstream edge Mb of a medium M0 does not necessarily have to be the same as the first light quantity Q1 used to detect the upstream edge Ma. Thus, both quantities may be different from each other. In the foregoing embodiment, the controller 40 determines the individual thicknesses of media M0 being fed; alternatively, once the controller 40 identifies a medium M0 as a thick medium such as a card M2, the controller 40 may disable the multi-feed detector 30 from determining overlapping of all the remaining media M0.

When a thick medium comes into contact with the transport roller pairs 16 and 16 or the ejection roller pairs 17 and 17 (see FIG. 3), a heavy load is sometimes placed on the transport roller motor 46 (see FIG. 4). When a heavy load is placed on the transport roller motor 46, the transport roller motor 46 may activate an overload detection function to interrupt the reading operation. Therefore, if identifying a medium M0 as being thick at Step S116 or S120 in FIG. 8, the controller 40 may suppress the transport roller motor 46 from activating the overload detection function. Suppressing the overload detection function of the transport roller motor 46 in this manner can reduce the risk of the reading operation being interrupted when a thick medium is fed.

Some image reading apparatuses are switchable between a horizontal position and a tilted position. When an image reading apparatus is in the horizontal position, the transport route is also in substantially the horizontal position. When an image reading apparatus is in the tilted position, the transport route slopes down in the feeding direction, but a stacker disposed in the ejection slot is in the horizontal position. Therefore, the angles of the transport route and the stacker are different from each other. In this case, when a thick medium is ejected from the transport route to the stacker through the ejection slot, the medium may be strongly brought into contact with the stacker and damaged accordingly. Therefore, the scanner 1A may include a detector that detects the position of the scanner 1A, and the controller 40 may acquire information regarding the position from the detector. Then, when a medium being fed is thick and the scanner 1A is in the tilted position, the controller may discontinue performing the reading operation at Step S120 in FIG. 8. In this way, it is possible to suppress a medium from being damaged by a stacker when the medium is ejected from the scanner 1A being in the tilted position.

Depending on the second light quantity Q2 of the light transmitter 31a as illustrated in FIG. 2 and other drawings, the optical medium detector 31 may identify a medium M0 as having a standard thickness, but the multi-feed detector 30 may erroneously detect that media M0 overlap each other at Steps S118 and S120 in FIG. 8, As a result, the controller 40 may discontinue performing the reading operation. In this case, the controller 40 may receive information indicating that the reading operation has been erroneously discontinued, from a user through the operation panel 7 or the control device 60 (see FIG. 4). In response to the reception of this information, the controller 40 may set the second light quantity Q2 within the range between the first light quantity Q1 and the previous second light quantity Q2, at Step S110 in FIG. 8 in the next transport control process. In this way, after the optical medium detector 31 has identified a medium M0 as being thick, the multi-feed detector 30 is less likely to erroneously detect that media M0 overlap each other at Steps S116 and S120 in FIG. 8.

(5) Conclusion

As described above, some aspects of the present disclosure successfully provide a technique, configuration, apparatus, and method, all of which do not involve using a sensor dedicated to detecting thick media but are less likely to erroneously determine that media overlap each other independently of their thickness. Obviously, the technique including the components of each independent claim also successfully provides basic effects and functions of the above technique, configuration, apparatus, and method.

Moreover, those skilled in the art would be able to conceive of configurations formed by replacing or combining components described in the foregoing embodiment or by replacing the components with those disclosed in the prior art. Obviously, such configurations may also be included in the scope of the present disclosure.

What is claimed is:

1. An image reading apparatus comprising:
a feeder that feeds a medium in a feeding direction;
a multi-feed detector that detects overlapping of the medium and another medium being fed along a transport route at a multi-feed detection location;
a reader that reads an image on the medium being fed, the reader being disposed downstream of the multi-feed detection location in the feeding direction;
a medium detector that detects presence or absence of the medium at a medium detection location positioned on the transport route between the feeder and the multi-feed detection location, the medium detector including a light transmitter that emits light with a light quantity to the medium detection location, the light quantity being variable, and a light receiver that receives the light that traveled across the transport route; and
a controller that performs a process in accordance with detection results of the multi-feed detector and the medium detector, wherein
when the medium detector detects that a state where the medium is absent is switched to a state where the medium is present with the light quantity set to a first light quantity, the controller switches the light quantity from the first light quantity to a second light quantity, the second light quantity being larger than the first light quantity,
when a quantity of the light received by the light receiver exceeds a threshold in response to switching of the light quantity from the first light quantity to the second light quantity, the controller determines whether the medium overlaps the another medium, based on the detection result of the multi-feed detector, and
when the quantity of the light received by the light receiver does not exceed the threshold in response to the switching of the light quantity from the first light quantity to the second light quantity, the controller skips determination of whether the medium overlaps the another medium.

2. The image reading apparatus according to claim 1, wherein
after determining whether the quantity of the light received by the light receiver exceeds the threshold in response to switching of the light quantity from the first light quantity to the second light quantity, the controller returns the light quantity to the first light quantity and then, when the medium detector detects that the state where the medium is present is switched to the state where the medium is absent, determines that a downstream edge of the medium is passing through the medium detection location.

3. The image reading apparatus according to claim 1, wherein
the controller determines whether the quantity of the light received by the light receiver exceeds the threshold, after the medium detector detects that the state where the medium is absent is switched to the state where the medium is present with the light quantity set to the first light quantity and before the medium is fed by a first distance, and
the first distance is equivalent to a size of a short side of a card defined in ID-1 of ISO/IEC 7810.

4. The image reading apparatus according to claim 3, wherein after the medium detector detects that the state where the medium is absent is switched to the state where the medium is present with the light quantity set to the first light quantity, when the medium is fed by a second distance, the controller determines whether the quantity of the light received by the light receiver exceeds the threshold, the second distance being shorter than the first distance.

5. The image reading apparatus according to claim 1, wherein
both the multi-feed detection location and the medium detection location are positioned within an area having a third length in a direction orthogonal to the feeding direction, a center of the area coinciding with a central location of the transport route in the direction orthogonal to the feeding direction, and
the third length is equivalent to a size of a short side of a card defined in ID-1 of ISO/IEC 7810.

6. The image reading apparatus according to claim 1, further comprising:
a lower unit disposed below the transport route; and
an upper unit disposed above the transport route, the upper unit being movable relative to the lower unit, wherein
the reader includes a first reader that reads an image on a lower surface of the medium and a second reader that reads an image on a upper surface of the medium, the first reader being disposed in the lower unit, the second reader being disposed in the upper unit,
the multi-feed detector includes a transmitter and a receiver, one of which is disposed in the lower unit and the other of which is disposed in the upper unit,
of the light transmitter and the light receiver, one is disposed in the lower unit, and the other is disposed in the upper unit, and
when the upper unit is disposed over the lower unit, the second reader faces the first reader, the receiver faces the transmitter, and the light receiver faces the light transmitter.

7. The image reading apparatus according to claim 1, wherein
in units of the media, the controller switches the light quantity from the first light quantity to the second light quantity and from the second light quantity to the first light quantity.

8. A method of controlling an image reading apparatus, the image reading apparatus including a feeder that feeds a medium in a feeding direction, a multi-feed detector that detects overlapping of the medium and another medium being fed along a transport route at a multi-feed detection location, a reader that reads an image on the medium being fed, the reader being disposed downstream of the multi-feed detection location in the feeding direction, and a medium detector that detects presence or absence of the medium at a medium detection location positioned on the transport route between the feeder and the multi-feed detection location, the medium detector including a light transmitter that emits light with a light quantity to the medium detection location, the light quantity being variable, and a light receiver that receives the light that traveled across the transport route, the image reading apparatus being configured to perform a process based on detection results of the multi-feed detector and the medium detector, the method comprising:

a first step of, when the medium detector detects that a state where the medium is absent is switched to a state where the medium is present with the light quantity set to a first light quantity, switching the light quantity from the first light quantity to a second light quantity, the second light quantity being larger than the first light quantity;

a second step of, when a quantity of the light received by the light receiver exceeds a threshold in response to switching of the light quantity from the first light quantity to the second light quantity, determining whether the medium overlaps the another medium, based on the detection result of the multi-feed detector; and a third step of, when the quantity of the light received by the light receiver does not exceed the threshold in response to the switching of the light quantity from the first light quantity to the second light quantity, skipping determination of whether the medium overlaps the another medium.

* * * * *